United States Patent [19]

Fredericks

[11] 4,416,645
[45] Nov. 22, 1983

[54] PILOTED FLEXIBLE COUPLING

[75] Inventor: Walter A. Fredericks, Warren, Pa.

[73] Assignee: Rexnord Inc., Milwaukee, Wis.

[21] Appl. No.: 339,024

[22] Filed: Jan. 13, 1982

[51] Int. Cl.³ .......................... F16D 3/78; F16D 3/50
[52] U.S. Cl. ...................................... 464/99; 464/81;
464/147
[58] Field of Search ....................... 464/99, 98, 69, 81,
464/147, 95, 72, 96, 152, 155

[56] References Cited

U.S. PATENT DOCUMENTS

| | | | |
|---|---|---|---|
| 2,846,857 | 8/1958 | Hagenlocher | 464/95 X |
| 3,124,942 | 3/1964 | Rothfuss et al. | 464/99 X |
| 3,654,775 | 4/1972 | Williams | 464/99 X |
| 3,732,706 | 5/1973 | Evan | 464/152 X |
| 4,055,966 | 11/1977 | Fredericks | 464/99 X |
| 4,096,711 | 6/1978 | Carlson et al. | 464/99 X |
| 4,196,597 | 4/1980 | Robinson | 464/99 X |
| 4,353,704 | 10/1982 | Corey | 464/72 X |

FOREIGN PATENT DOCUMENTS 2060792 12/1970 Fed. Rep. of Germany ........ 464/99

Primary Examiner—Billy S. Taylor
Assistant Examiner—Dao Van Huynh
Attorney, Agent, or Firm—Theresa F. Camoriano;
Vance A. Smith

[57] ABSTRACT

A flexible coupling comprising first and second hubs and a center member aligned on a longitudinal axis. At least one spool is also aligned on said axis. There is a plurality of discs forming at least three flexible joints between the hubs, center member and spool, wherein no more than two of the flexible joints permit both axial and angular misalignment, the remainder of the flexible joints including piloting means for eliminating angular misalignment while permitting axial misalignment.

12 Claims, 4 Drawing Figures

PILOTED FLEXIBLE COUPLING

BACKGROUND OF THE INVENTION

This invention relates to flexible couplings and more particularly to a disc-type flexible torque transmission coupling.

There are several different flexible couplings that have been used in the past to connect two shafts so that torque is transmitted between the shafts. The couplings can be divided into two general types: dfirst, the mechanical flexing couplings and, second, the material flexing couplings. Mechanical flexing couplings provide flexibility by allowing the components to slide or move relative to each other. An advantage of mechanical flexing couplings is that they generally permit greater axial misalignment between shafts than do material flexing couplings; however, the material flexing couplings have several features which have them preferable to mechanical flexing couplings. For example, material flexing couplings do not require lubrication, whereas mechanical flexing couplings usually require lubrication due to the frictional sliding motion involved. Some amount of clearance between mating gear teeth is always required in the mechanical flexing couplings, both in the interest of manufacturing tolerances and to allow for lubrication. This means that there may be torsional backlash in the mechanical flexing couplings, whereas there is no backlash with material flexing couplings.

The material flexing couplings provide flexibility by having certain parts designed to flex. These flexing elements can be of various materials, such as metal, rubber, or plastic. Couplings of this type generally must be operated within the fatigue limits of the material of the flexing element. Most metals have a predictable fatigue limit and permit the establishment of definite boundaries of operation. Elastomers (rubber, plastic, etc.) usually do not have a well-defined fatigue limit, and service life is determined primarily by the operational conditions. The material flexing group includes laminated-disc, diaphragm, spring, and elastomer couplings.

When a flexible disc is alternately bolted to two rigid members to form a flexible joint as in the typical flexible disc couplings, that flexible joint permits two types of misalignment between the two rigid members—axial misalignment and angular misalignment. In axial misalignment, the rigid members are separated an axial distance which is different from the design distance. In angular misalignment, the central longitudinal axes of the two rigid members do not perfectly coincide as they should but instead intersect at a point.

Examples of material flexing couplings are the flexible disc coupling disclosed in U.S. Pat. No. 4,055,966 "Fredericks", hereby incorporated by reference, and the diaphragm coupling disclosed in U.S. Pat. No. 4,196,597 "Robinson", hereby incorporated by reference. Flexible disc couplings are superior to diaphragm couplings in several respects. For example, flexible disc couplings are much simpler than diaphragm couplings. Also, the flexible discs are not hidden, thereby making it easy to visually detect failure in the flexible elements. Flexible disc couplings also usually occupy less space than diaphragm couplings, which is often an important consideration due to space limitations. However, the diaphragm couplings generally have the advantage of allowing greater axial misalignment between the hubs than the disc couplings.

The art has long sought, without avail, a flexible disc coupling having the ability to permit greater axial misalignment between the hubs. One approach to such a coupling would be to add an additional flexible disc and center member in series with the double-flexible coupling shown in Fredericks, thereby creating a triple-flexing coupling. This triple-flexing coupling should permit greater angular and axial misalignment than the double-flexing coupling, but I believe it would be radially unstable. Since there are three flexible joints in this coupling instead of two, the center portion would not remain in position on the central axis; instead, it might tend to be thrown outward due to centrifugal force.

SUMMARY OF THE INVENTION

A main object of the present invention is to provide a simple, compact, radially stable flexible disc coupling which permits substantially greater axial misalignment than the double flexing disc couplings of the prior art. This object is accomplished by providing a coupling having at least three flexible joints wherein no more than two of the flexible joints allow both axial and radial misalignment. The remainder of the flexing joints are limited to only axial misalignment by piloting the two adjacent rigid members to each other in a close sliding fit, such that their central longitudinal axes coincide.

DESCRIPTION OF THE PREFERRED EMBODIMENTS

Figure 1:
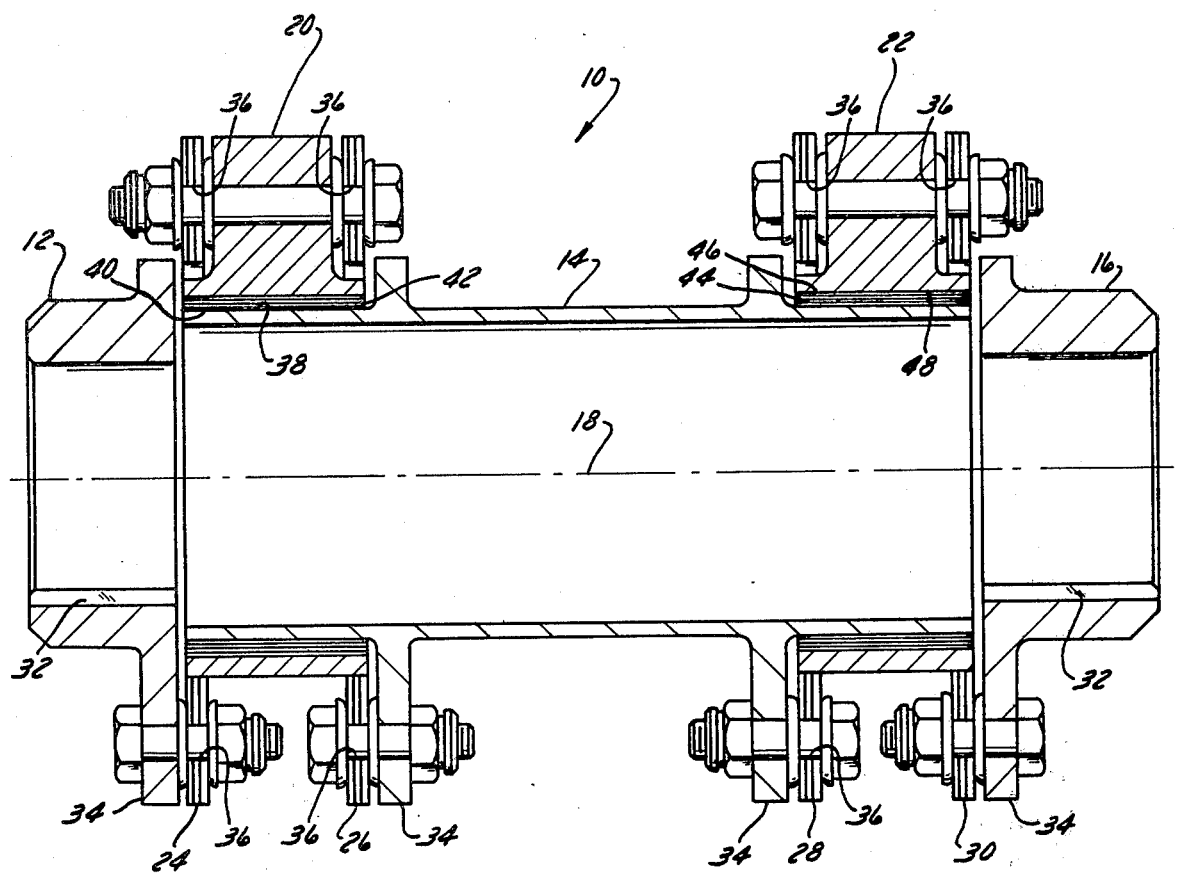
FIG. 1 is a side sectional view of a coupling made in accordance with the present invention.
Figure 2:
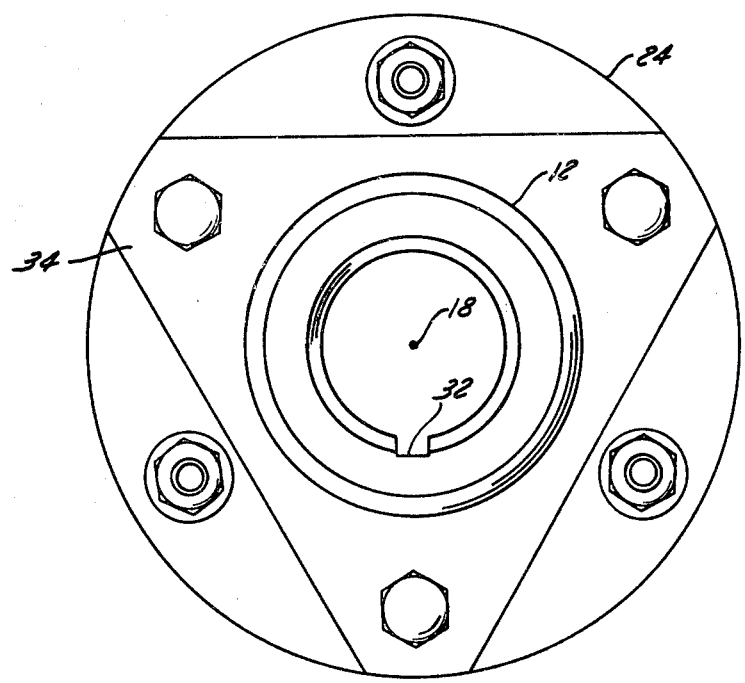
FIG. 2 is an end view of the coupling shown in FIG. 1.

FIGS. 1 and 2 show a flexible coupling 10 made up of a first hub 12, a center member 14 and a second hub 16 aligned along a central longitudinal axis 18. A spool 20 is located between the first hub 12 and the center member 14. Likewise, a spool 22 is located between the center member 14 and the second hub 16. Hubs 12, 16, center member 14, and spools 20, 22 are all rigid members which are interconnected by means of flexible discs 24, 26, 28, 30.

Each hub 12, 16 has a keyway 32 along its inner surface which permits the hubs 12, 16 to be attached to shafts (not shown). While the use of keyways to attach the shafts to the hubs is common, other known methods may also be used. The hubs 12, 16 and the center member 14 have triangular-shaped flanges 34 which permit these rigid members to be connected to the flexible discs 24, 26, 28, 30.

Each flexible disc has a plurality of apertures 36 through which the disc is alternately bolted to two adjacent rigid members so as to couple the rigid members. The flexible disc 24 is alternately bolted to the hub 12 and to the spool 20, so as to create a flexible joint between the hub and spool. This flexible joint permits both axial and angular misalignment between the hub 12 and the spool 20 by means of flexure of the flexible disc 24 while transmitting torque between the hub 12 and the spool 20. The bolting arrangement is shown clearly in FIG. 2. It can be seen that the flexible disc 24 and the other flexible discs are actually laminated, or made up of several thin layers. This lamination is described in some detail in the Fredericks patent referred to earlier. While lamination is common and has several advantages, it is not necessary; instead, each disc could be made up of a single piece of material, for example.

Looking now at the flexible joint between the spool 20 and the center member 14, it can be seen that the rigid members 20, 14 are flexibly connected by means of the flexible disc 26 which is alternately bolted to the spool 20 and to the center member 14 through the angularly-spaced longitudinal apertures 36 of flexible disc 26. While the flexible disc 26 would normally permit both axial and angular misalignment between the spool 20 and the center member 14, there are cooperating means on the spool 20 and the center member 14 which eliminate angular misalignment between those rigid members. It can be seen that the first rigid element 14 has a cylindrical outer surface portion 38, and the second rigid element 20 has a cylindrical inner surface portion 40. The cylindrical inner surface 40 of the spool 20 is formed by pressing a bushing 42 into the spool 20. The bushing 42 could be installed by other known method, and could be installed on the center member 14 instead of on the spool 20, or bushings could be installed on both the spool 20 and center member 14. There is a close sliding fit between the cylindrical outer surface 38 of the center member 14 and the cylindrical inner surface 40 of the spool 20, so that relative motion between the spool 20 and the center member 14 is restricted to motion along the axis 18, and angular misalignment between the spool 20 and the center member 14 is eliminated.

The size of the gap between the inner and outer cylindrical surfaces 40, 38 which is needed to provide a close sliding fit varies, depending upon the material from which the bushing 42 is made and upon the diameter of the coupling 10. The gap is adequate if the coupling 10 can operate at high speeds without developing radial instability. The bushing 42 may be made of any good bushing material, such as brass, polished steel or teflon. If the bushing 42 is made of a metal such as brass or polished steel, there must be some space between the inner surface 40 and the outer surface 38. In the case of a coupling for a one-inch shaft, a gap in the range of 0.0005 to 0.001 inches should be adequate for a metal bushing. In the case of a coupling for an eight-inch shaft, the gap may be in the range of 0.001 to 0.0015 inches. More clearance could be tolerated in slower speed couplings. In order to achieve these close fits, it has been the practice to hand polish all the parts involved. If a teflon or other polymeric bushing is used, there may be some interference fit between the inner surface 40 and the outer surface 38, because the polymeric bushing will deform somewhat to permit sliding.

Now, looking at the left half of the coupling 10 as a whole, it can be seen that there are two flexing joints between the first hub 12 and the center member 14. The first flexing joint is formed by flexible disc 24, and permits both angular and axial misalignment between the hub 12 and the spool 20. The second flexible joint is formed by the flexible disc 26. This second flexing joint permits only axial misalignment between the center member 14 and the spool 20, because the close sliding fit (telescoping piloting) between the spool 20 and the center member 14 effectively eliminates angular misalignment between those members.

Looking now at the right half of the coupling 10, it can be seen that the flexible disc 30 is alternately bolted to the spool 22 and to the second hub 16, so as to permit both angular and axial misalignment between the rigid members 22, 16. The flexible disc 28 is alternately bolted to the center member 14 and to the spool 22 to create a flexible joint between those two members. Again, the center member 14 is piloted to the spool 22 with a close sliding fit so as to effectively eliminate angular misalignment between the spool 22 and the center member 14. In this case, a bushing 44 is press fit onto the tubular center member 14 to form a cylindrical outer surface portion 46, which has a close sliding fit with the cylindrical inner surface 48 of spool 22. This close sliding fit means that relative motion between the center member 14 and the spool 22 is limited to sliding motion in which the center member 14 and spool 22 both remain aligned on the longitudinal axis 18.

Looking now at the coupling 10 as a whole, there are four flexing joints between the first hub 12 and the second hub 16. Two of the flexing joints are formed by flexible discs 24 and 30 and permit both axial and angular misalignment between the hubs 12 and 16. The other two flexing joints are formed by flexible discs 26 and 28 and permit only axial misalignment, due to cooperating means on the spools and the center member which eliminate angular misalignment. Since the number of joints permitting angular misalignment is limited to two, radial stability of the coupling 10 is maintained, and, since two additional flexing joints also permit axial misalignment, this coupling 10 permits substantially greater axial misalignment than does a standard double flexing disc coupling of the prior art. While the coupling 10 has two flexing joints which are restricted to permitting only axial misalignment, it can be seen that even one such flexing joint would increase the axial misalignment capability of a coupling.

Figure 3:
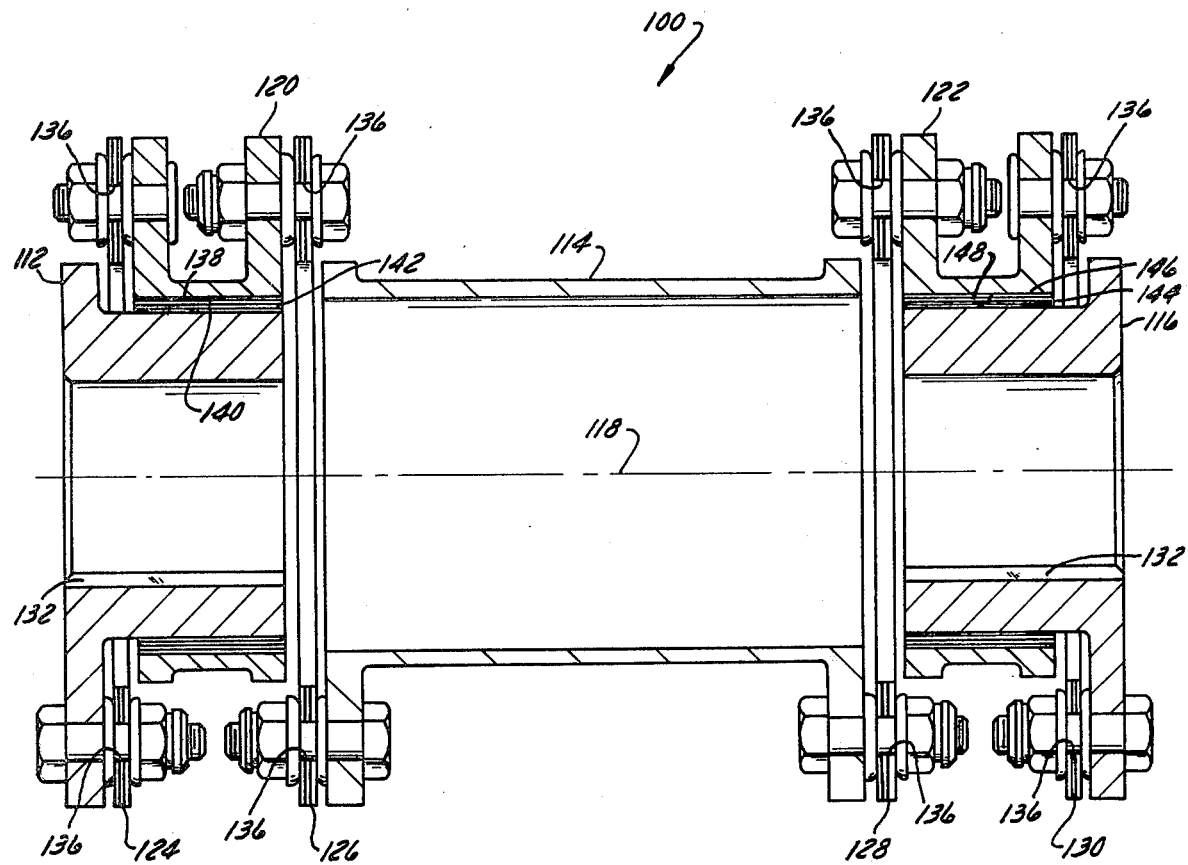
FIG. 3 is a side sectional view of a second embodiment of a coupling made in accordance with the present invention.

FIG. 3 illustrates a second embodiment of a coupling 100 made up of a first hub 112, a center member 114, and a second hub 116 aligned along a central longitudinal axis 118. A spool 120 is located between the first hub 112 and the center member 114 and is aligned on the axis 118. Likewise, a spool 122 is located between the center member 114 and the hub 116 and is aligned on the axis 118. A plurality of flexible discs 124, 126, 128, 130 is provided to flexibly interconnect the rigid members 112, 114, 116, 120 and 122. Each flexible disc 124, 126, 128, 130 has a plurality of angularly spaced, longitudinal apertures 136 which permit the flexible discs to be bolted to the rigid members.

A tubular bushing 142 is press fit onto the tubular hub member 112 to provide a cylindrical outer surface portion 138 on the first rigid element 112. The second rigid element 120 has a cylindrical inner surface 140 which has a close sliding fit with the outer cylindrical surface 138. This close sliding fit effectively eliminates angular misalignment between first rigid element 112 and second rigid element 120. The flexible disc 124 is alternately bolted to the first hub 112 and to the spool 120 so as to provide a flexible connection between those members. However, due to the close sliding fit between those members, there will be only axial misalignment between the hub 112 and the spool 120. The flexible disc 126 is alternately bolted to the spool 120 and to the center member 114 so as to permit both axial and angular misalignment between those rigid members. The flexible disc 128 is alternately bolted to the center member 114 and to the spool 122 to permit both axial and angular misalignment between those rigid members. Bushing 144 is press fit onto the hub 116 to form a cylindrical outer surface 146 of the hub 116. The cylindrical surface 148 of the spool 122 has a close sliding fit with the outer surface 146 of the hub 116, thereby eliminating angular misalignment between the spool 122 and the hub 116. The spool 122 and hub 116 are flexibly connected to each other by means of the flexible disc 130, which is alternately bolted to those rigid members.

While the arrangement of this coupling 100 is different from the arrangement of the coupling 10 shown earlier, the effect is the same. This coupling has two flexing joints which permit both axial and angular misalignment and two flexing joints which permit only axial misalignment. Since only two flexible joints permit angular misalignment, the coupling is radially stable.

Figure 4:
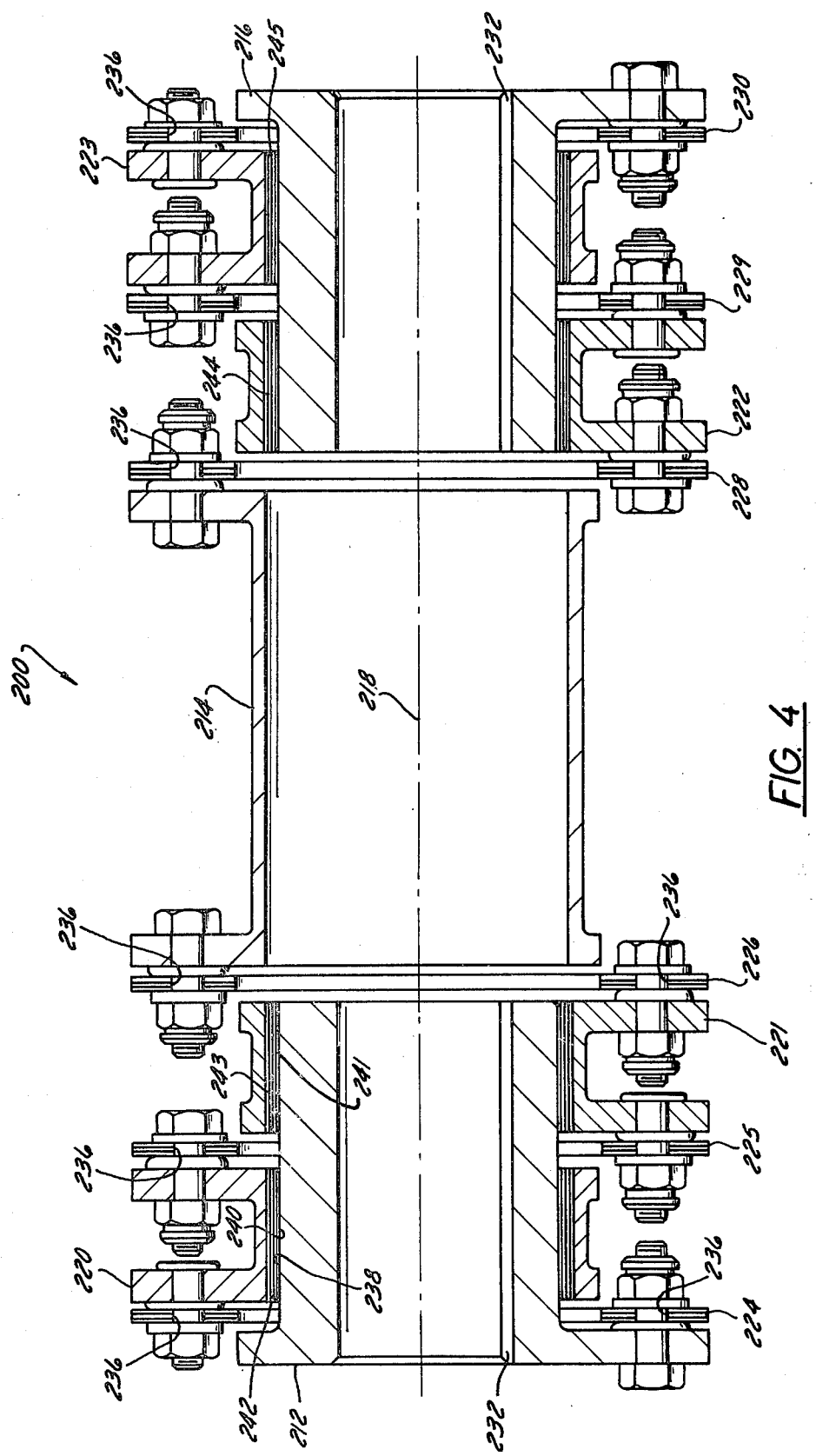
FIG. 4 is a side sectional view of a third embodiment of a coupling made in accordance with the present invention.

FIG. 4 illustrates a coupling 200 which has more flexible joints than the couplings shown earlier. Flexible coupling 200 is made up of a first hub 212, a center member 214, and a second hub 216 aligned along a central longitudinal axis 218. Spools 220 and 221 are aligned on the axis 218 between the hub 212 and the center member 214. The spools 222 and 223 are aligned on the axis 218 between the center member 214 and the hub 216. A bushing 242 is pressed into the spool 220 to form a cylindrical inner surface 240 of spool 220. Likewise, a bushing 243 is pressed into the spool 221 to form a cylindrical inner surface 241 of spool 221. The hub 212 has a cylindrical outer surface 238 which has a close sliding fit with the inner cylindrical surfaces 240 and 241. This close sliding fit eliminates angular misalignment between spool 220 and hub 212 as well as between spool 221 and hub 212.

The flexible disc 224 is alternately bolted to the hub 212 and to the spool 220, so that axial misalignment is permitted between those rigid members while allowing torque to be transmitted between those members. Likewise, flexible disc 225 is alternately bolted to the spool 220 and to the spool 221. Since the close sliding fit between the spools 220, 221 and the hub 212 eliminates angular misalignment between those spools and the hub, it also eliminates angular misalignment of one spool relative to the other; therefore, the flexible joint formed by flexible disc 225 permits only axial misalignment. Flexible disc 226 is alternately bolted to the hub 212 and to the center member 214 and permits both axial and angular misalignment between spool 221 and center member 214. The right half of coupling 220 is a mirror image of the left half and therefore will not be described in detail.

Looking at the coupling 200 as a whole, it can be seen that there are two flexible joints which permit both angular and axial misalignment. These flexible joints are formed by the flexible discs 226 and 228. The other four flexible joints in this coupling, formed by flexible discs 224, 225, 229 and 230, permit only axial misalignment between adjacent rigid members. Therefore, the coupling 200 shown in FIG. 4 permits greater axial misalignment than do the first and second embodiments of this invention.

Other embodiments can be imagined in which more flexible discs and more spools are added, piloting either to the hubs or to the center member, in order to achieve greater axial misalignment. Other embodiments can be imagined by one skilled in the art in which the right half of the coupling is not a mirror image of the left half of the coupling. In fact, one half of the coupling could be another type of coupling such as an elastomer coupling, and the other half could correspond to half of one of the couplings shown here. Many other additions and combinations of the elements shown in the preferred embodiments should be obvious to one skilled in the art upon reading the foregoing description.

What is claimed is:

1. A flexible torque transmission coupling, comprising:
   a flexible disc having a central longitudinal axis and having a plurality of angularly-spaced, longitudinal apertures equidistant from said axis;
   first and second rigid elements aligned along said axis, wherein said disc is alternately secured to said first and second rigid elements through said apertures so as to transmit torque between said rigid elements; and
   cooperating means on said first and second rigid elements for eliminating angular misalignment between said first and second rigid elements while still permitting axial misalignment between them, wherein said cooperating means comprises said first rigid element having a cylindrical outer surface portion and said second rigid element having a cylindrical inner surface portion, wherein said cylindrical outer surface fits into said cylindrical inner surface with a close sliding fit.

2. A flexible torque transmission coupling as recited in claim 1, wherein said second rigid element includes a spool, and a bushing installed in said spool to form the cylindrical inner surface portion of said second rigid element.

3. A flexible torque transmission coupling as recited in claim 1, wherein said first rigid element includes a tubular member and a bushing installed onto said tubular member to provide the cylindrical outer surface portion of said first rigid element.

4. A flexible torque transmission coupling comprising:
   a rigid spool;
   a rigid, cylindrically-shaped member which is aligned with said spool along a central longitudinal axis and which telescopically pilots to said spool to eliminate angular misalignment while permitting axial misalignment between said spool and said cylindrically-shaped member; and
   a flexible disc which, at angularly-spaced points, equidistant from said axis is alternately rigidly connected to said spool and to said cylindrically-shaped member so as to transmit torque between them.

5. A flexible torque transmission coupling as recited in claim 4, wherein said said cylindrically-shaped member includes a cylindrical bushing which forms its outer surface, and wherein the outer surface of said cylindrically-shaped member has a close sliding fit with the inner surface of said spool.

6. A flexible torque transmission coupling as recited in claim 4, wherein said spool includes a cylindrical bushing which forms its inner surface, and wherein the inner surface of said spool has a close sliding fit with the outer surface of said cylindrically-shaped member.

7. A flexible torque transmission coupling, comprising:
   first and second rigid hubs aligned along a central longitudinal axis;

a rigid center member situated between said hubs and aligned along said axis;

at least one rigid spool located between said center member and said first hub and aligned along said axis, wherein said spool pilots to said first hub with a close sliding fit so as to eliminate misalignment between said first hub and said spool while permitting axial misalignment; and at least three flexible discs interconnecting said hubs, spool and center member, one of said flexible discs being alternately connected to said first hub and to said spool through angularly-spaced apertures equidistant from said axis, and another of said flexible discs being alternately connected to said spool and said center member through angularly-spaced apertures equidistant from said axis.

8. A flexible torque transmission coupling, comprising:

first and second rigid hubs aligned along a central axis;

a rigid center member situated between said hubs and aligned along said axis;

at least one rigid spool located between said center member and said first hub and aligned along said axis, wherein said spool pilots to said center member with a close sliding fit so as to eliminate angular misalignment between said spool and said center member; and at least three flexible discs interconnecting said hubs, spool and center member, one of said flexible discs being alternately connected to said first hub and to said spool through angularly-spaced apertures equidistant from said axis, and another of said flexible discs being alternately connected to said spool and said center member through angularly-spaced apertures equidistant from said axis.

9. In a flexible torque transmission coupling having first and second hubs and a center member aligned along a longitudinal axis and connected together by means of flexible discs, through a plurality of angularly-spaced apertures equidistant from said axis the improvement comprising:

a rigid spool located between said center member and said first hub, aligned along said axis, and flexibly connected to said first hub and to said center member by means of said flexible discs, wherein said spool is telescopically piloted to said center member with a close sliding fit so as to eliminate angular misalignment and permit axial misalignment between said spool and said center member.

10. In a flexible torque transmission coupling having first and second hubs and a center member aligned along a longitudinal axis and connected together by means of flexible discs, through a plurality of angularly-spaced apertures equidistant from said axis the improvement comprising:

a rigid spool located between said center member and said first hub, aligned along said axis, and flexibly connected to said first hub to said center member by means of said flexible discs, wherein said spool is piloted to said first hub with a close sliding fit so as to eliminate angular misalignment and permit axial misalignment between said spool and said first hub.

11. A flexible torque transmission coupling, comprising:

first and second hubs and a center member aligned on a longitudinal axis;

at least one spool aligned on said axis;

a plurality of flexible discs forming at least three flexible joints between said hubs, center member and spool, by means of connections through a plurality of angularly-spaced apertures equidistant from said axis wherein no more than two of said flexible joints permit both axial and angular misalignment, the remainder of said flexible joints including piloting means for eliminating angular misalignment while permitting axial misalignment.

12. A method of flexibly coupling two shafts for transmission of torque, comprising:

driving a first flexible member by an end hub connected to one shaft;

driving a first spool by connection to said first flexible member;

radially supporting one end of a center hub in said first spool while permitting axial movement therebetween;

driving said center hub by said first spool through mutual connection to a second flexible member;

radially supporting the other end of said center hub in a second spool while permitting axial movement therebetween;

driving said second spool by said center hub through mutual, angularly spaced connections to a third flexible member; and driving a second end hub by said second spool through mutual angularly spaced connections to a fourth flexible member.

* * * * *